United States Patent
Kocha et al.

(10) Patent No.: US 7,327,419 B2
(45) Date of Patent: Feb. 5, 2008

(54) ACTIVE-MATRIX COLOR LCD DEVICE HAVING A POLISHED COLOR FILTER SUBSTRATE

(75) Inventors: Yoko Kocha, Kanagawa (JP); Hidenori Ikeno, Kanagawa (JP); Hiroki Sato, Akita (JP)

(73) Assignee: NEC LCD Technologies, Ltd. (JP)

( * ) Notice: Subject to any disclaimer, the term of this patent is extended or adjusted under 35 U.S.C. 154(b) by 166 days.

(21) Appl. No.: 10/912,691

(22) Filed: Aug. 5, 2004

(65) Prior Publication Data

US 2005/0030449 A1 Feb. 10, 2005

(30) Foreign Application Priority Data

Aug. 6, 2003 (JP) .............................. 2003-287868

(51) Int. Cl.
*G02F 1/1335* (2006.01)
*G02F 1/1333* (2006.01)

(52) U.S. Cl. ...................................... 349/106; 349/110

(58) Field of Classification Search ........ 349/106–108, 349/110
See application file for complete search history.

(56) References Cited

U.S. PATENT DOCUMENTS 6,424,402 B1 * 7/2002 Kishimoto ................... 349/156

FOREIGN PATENT DOCUMENTS

| JP | 09-230124 | 9/1997 |
|---|---|---|
| JP | 11-006913 | 1/1999 |
| JP | 11-218606 | 8/1999 |
| JP | 11-218607 | 8/1999 |
| JP | 11-242108 | 9/1999 |
| JP | 2001-075086 | 3/2001 |

* cited by examiner

*Primary Examiner*—Dung T. Nguyen
(74) *Attorney, Agent, or Firm*—Hayes Soloway P.C.

(57) ABSTRACT

A color filter substrate in an active-matrix LCD device has a glass substrate, and a black matrix, coloring layers and an orientation film which are consecutively formed on the glass substrate. The projected surfaces of the coloring layers due to overlapping with the black matrix are polished to reduce the width of the slope surfaces of the projected surface of the coloring layers. The polishing of the coloring layers prevents a disclination caused by the slope surface.

10 Claims, 4 Drawing Sheets

ACTIVE-MATRIX COLOR LCD DEVICE HAVING A POLISHED COLOR FILTER SUBSTRATE

BACKGROUND OF THE INVENTION (a) Field of the Invention

The present invention relates to an active-matrix LCD (liquid crystal display) device and, more particularly, to an active-matrix LCD device including a color filter substrate having a polished surface. The present invention also relates to a method for manufacturing such a color filter substrate.

(b) Description of the Related Art

Active-matrix LCD devices are increasingly used for display of color images. FIG. 7 shows a conventional LCD device in a sectional view. The active-matrix color LCD device includes a TFT substrate 30 on which thin film transistors (or active elements, not shown in the figure) are formed, and a color filter substrate (or counter substrate) 10A mounting thereon a color filter. The TFT substrate 30 and the color filter substrate 10 oppose each other with a liquid crystal (LC) layer 40 being sandwiched therebetween. There are three (R, G and B) coloring layers 23 provided on the color filter substrate 10A to enable the color image display.

The color filer substrate 10A includes a glass substrate 21, a black matrix (BM) 22 formed thereon and having a substantially lattice pattern, coloring layers 23 each formed on the glass substrate 21 in the space of the lattice of the black matrix 22 and on the edge portion of the stripe of the lattice of the black matrix 22, and a transparent electrode 24 formed on the coloring layers 23 and the other portions of the lattice of the black matrix 22. Each coloring layer 23 has a thickness of around 1 to 3 µm, for example.

The black matrix 22 has spaces within the lattice pattern, prevents leakage of light, shields an alignment defect of the LC layer, and defines the light transmission areas or pixel image areas. The black matrix 22 is made of a chrome film, or a resin film into which carbon etc. is dispersed. In a recent trend, the resin film is increasingly used for the black matrix 22 due to the rising cost of the chrome film.

The surface of each coloring layer 23 has a step difference between a first area, or protruding area, wherein the edge of the stripe of the black matrix 22 and the edge of the coloring layer 23 overlap each other, and a second area, or substantially flat area, wherein the coloring layer 23 is formed directly on the glass filter 21 in the space of the black matrix 22.

The step difference between the first area and the second area causes a problem known as disclination. If the black matrix 22 is made of a chrome film, the disclination problem scarcely arises due to the small thickness, 0.1 to 0.2 µm, of the chrome film which is well smaller than the thickness of the coloring layer 23. On the other hand, if the black matrix 22 is made of a resin film, the disclination problem arises due to the larger thickness of the resin film, which amounts around 1 to 2 µm to achieve a sufficient light shielding property or light absorbing property.

To solve the problem as described above in connection with the resin film of the black matrix, an overcoat film made of acrylic resin or epoxy resin may be provided between the coloring layers 23 and the transparent electrode 24 for improving the surface flatness of the overall color filter substrate 10A. This requires, however, an additional fabrication step to thereby increase the cost for the LCD device. Another technique for improving the surface flatness of the color filter substrate 10A is such that the surfaces of the coloring layers 23 are polished, after forming the coloring layers 23 by using an electrodeposition technique. This technique is described in JP-A-9-230124, for example.

In the conventional technique, the allowable step difference for the surface of the color filter substrate 10A is generally below 0.5 µm, as described in the above patent publication. More specifically, it is generally considered that a step difference below 0.5 µm in the coloring layers is sufficient to suppress the disclination of the LCD device caused by the surface of the color filter substrate.

However, the present inventors found from a variety of simulations and experiments that the step different below 0.5 µm did not necessarily suppress the disclination problem caused by the step difference depending on the conditions or configurations of the LCD device.

SUMMARY OF THE INVENTION

In view of the above, it is an object of the present invention to provide an LCD device having a color filter substrate, which is effectively suppressing the disclination problem caused by the step difference on the coloring layers.

It is another object of the present invention to provide a method for fabricating such a color filter substrate for use in an active-matrix LCD device.

The present invention provides a liquid crystal display device (LCD) including a TFT substrate, a color filter substrate, and a twisted nematic liquid crystal (LC) layer sandwiched between the TFT substrate and the color filter substrate, the color filter substrate including: a transparent substrate; a light shield layer formed on the transparent substrate and having a substantially lattice pattern; a coloring layer formed on a portion of the transparent substrate within a space of the light shield layer and on an edge portion of a stripe of the light shield layer; and an orientation film overlying the coloring layers and the other portions of the stripes of the light shield layer, the coloring layer having a substantially flat surface overlying the space of the light shield layer, a slope surface extending and rising from the flat surface and overlying the edge portion of the stripe of the light shield layer, a polished flat surface extending from the slope surface, and a rear edge surface extending between the polished flat surface and the other portion of the stripe of the light shield layer, wherein the following relational expression holds:

$$D = 2\phi - \left(0.25\theta + 1 + \sqrt{\frac{L^{1/4} - 1.034}{0.03724}}\right) > 0,$$

where θ, L and φ represent an angle of the slope surface with respect to a surface of the transparent substrate, a width of the slope surface, and a pre-tilt angle of LC molecules in the LC layer.

The present invention also provides a method for fabricating a color filter substrate in a liquid crystal display (LCD) device including a TFT substrate, the color filter substrate, and a twisted nematic liquid crystal (LC) layer sandwiched between the TFT substrate and the color filter substrate, the method including the consecutive steps of: forming a light shield layer having a substantially lattice pattern on a transparent substrate; forming a coloring layer on a portion of the transparent substrate within a space of the light shield layer and on an edge portion of a stripe of the light shield layer, the coloring layer having a substantially flat surface overlying the space of the light shield layer, a slope surface extending and rising from the flat surface and overlying the edge portion of the stripe of the light shield layer, and a rear edge surface extending between the slope surface and the other portion of the stripe of the light shield layer; polishing a surface portion of the coloring layer so that a polished surface formed between the slope surface and the rear edge surface satisfies the following relational expression:

$$D = 2\phi - \left(0.25\theta + 1 + \sqrt{\frac{L^{1/4} - 1.034}{0.03724}}\right) > 0,$$

where the θ, L and φ represent an angle of the slope surface with respect to a surface of the transparent substrate, width of a remaining portion of the slope surface after the polishing, and a pre-tilt angle of LC molecules in the LC layer; and forming an orientation film overlying the coloring layers and the other portion of the light shield layer.

In accordance with the LCD device of the present invention and the color filter substrate manufactured by the method of the present embodiment, the polished surfaces of the coloring layers prevent generation of the disclination caused by the step differences in the surfaces of the coloring layers, thereby improving the image quality of the LCD device.

The above and other objects, features and advantages of the present invention will be more apparent from the following description, referring to the accompanying drawings.

PREFERRED EMBODIMENT OF THE INVENTION

Now, the present invention is more specifically described with reference to accompanying drawings.

Figure 7:
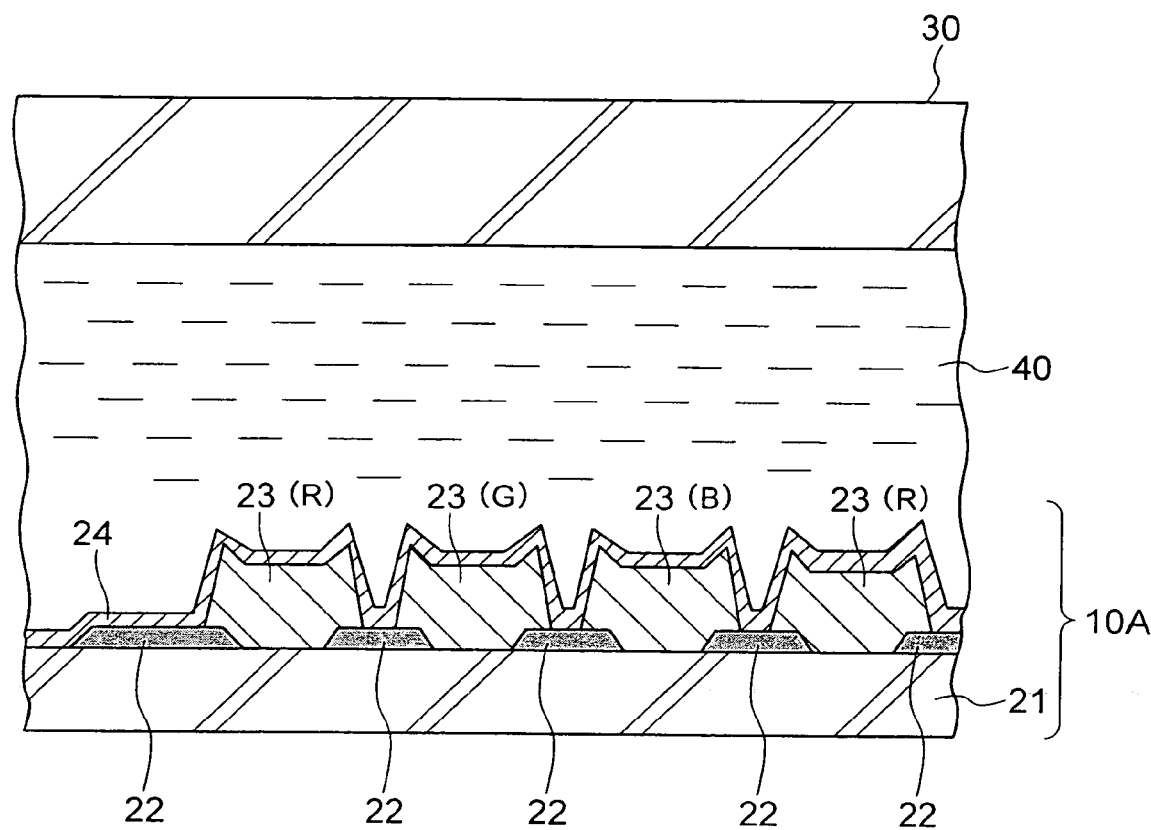
FIG. 7 is a sectional view of a general LCD device having a color filter substrate.

An LCD device according to an embodiment of the present invention has a structure similar to the structure described in connection with the conventional LCD device with reference to FIG. 7, except for the structure of the color filter substrate. Thus, description of the structures other than the structure of the color filter substrate is omitted herein for avoiding the duplication.

Figure 1:
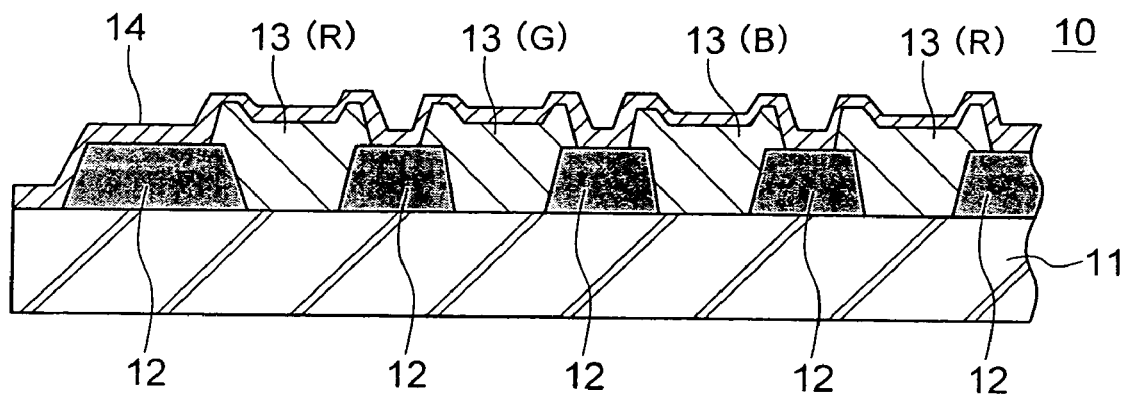
FIG. 1 is a sectional view of a color filter substrate according to an embodiment of the present invention.

Referring to FIG. 1, the color filter substrate, generally designated by numeral 10, used in the LCD device according to the embodiment of the present invention includes a transparent substrate, e.g., glass substrate 11, a black matrix 12 having a substantially lattice pattern, coloring layers 13 each formed on the glass substrate 11 in a corresponding space of the black matrix 12 and on the edge portion of the stripe of the black matrix 12, and a transparent electrode 14 formed on the coloring layers 13 and the stripes of the black matrix 12. The color filter substrate 10 is used, for example, in a normally-white LCD device including a twisted nematic LC layer. The driving voltage of the LC layer in the LCD device is 3.3 volts, 4 volts, or 5 volts, for example. For an LCD device having a driving voltage of 5 volts, ZL14792 (trade mark, from Merck) may be used as the LC material.

The black matrix 12 prevents leakage of light, shields defects in the alignment of the LC layer, and defines the light transmission area in the space of the lattice pattern. Each light transmission area constitutes a pixel display area in the LCD device. The black matrix 12 is made of a resin including carbon etc. dispersed therein, and has a stripe width of 20 μm, for example. The black matrix 12 is generally required to have an optical density (OD) of 3 or above in the optical property thereof, and thus has a thickness of, for example, 1.3 μm to achieve this optical property required. The optical density OD of the black matrix 12 is defined by the following formula:

$$OD = -\log(1/Io)$$

where Io and 1 represent the intensity of incident light for the black matrix and the intensity of transmitted light therethrough, respectively.

The material of the coloring layers 13 is prepared from a resin by dispersion of organic pigment therein. The coloring layers 13 are formed by a coating technique on the transparent substrate 11, on which the black matrix 12 is patterned, then exposed to light, developed and baked. The coloring layers 13 have a thickness of around 1.6 μm and include red (R), green (G) and blue (B) layers for respective pixel display areas.

Figure 4:
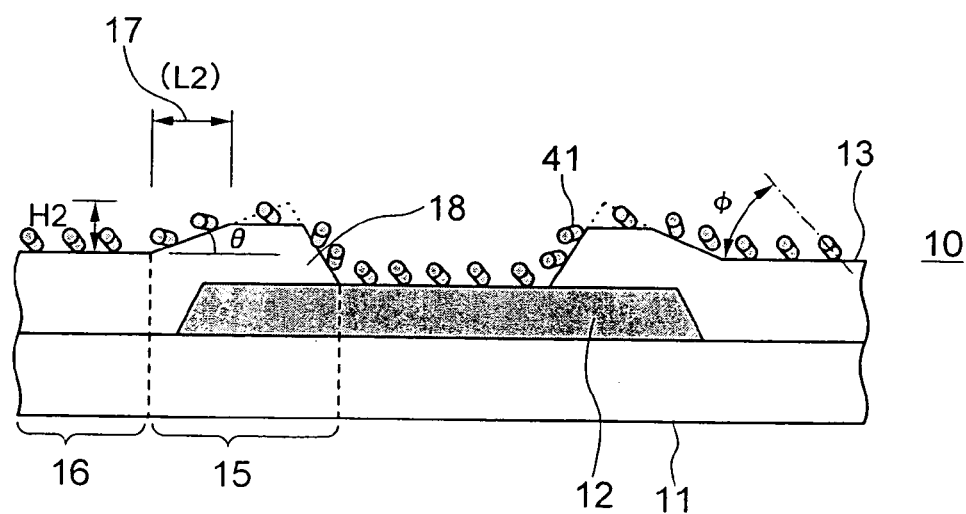
FIG. 4 is an enlarged sectional view of a portion of the color filter substrate of FIG. 1 after the polishing step for the coloring layers.

The surfaces of the coloring layers 13 are polished, after the coating thereof, to remove projecting portions thereof, at which the coloring layers 13 overlap the stripe of the black matrix 12 and thus have a larger height with respect to the glass substrate 11. The polished portion of the coloring layer 13 is shown in FIG. 4, which shows the color filter substrate 10 after incorporation into an LCD device. It is to be noted that the transparent electrode 14 and the orientation film are omitted for depiction in FIG. 4.

After the polishing treatment of the coloring layers 13, the transparent electrode 14 is formed which applies an electric field to the LC layer. An orientation film made of polyimide resin, for example, is formed on the transparent electrode 14. The color filter substrate 10 contacts the LC molecules 41 in the LC layer via the orientation film. The pre-tilt angle φ of the LC molecules 41 in contact with the orientation film is set at 3 degrees, for example.

The polishing of the coloring layers 13 as described above prevents the LC molecules 41 in the vicinity of the color filter substrate 10 from exhibiting a disclination. This will be described hereinafter with reference to FIGS. 2 to 6.

Figure 2:
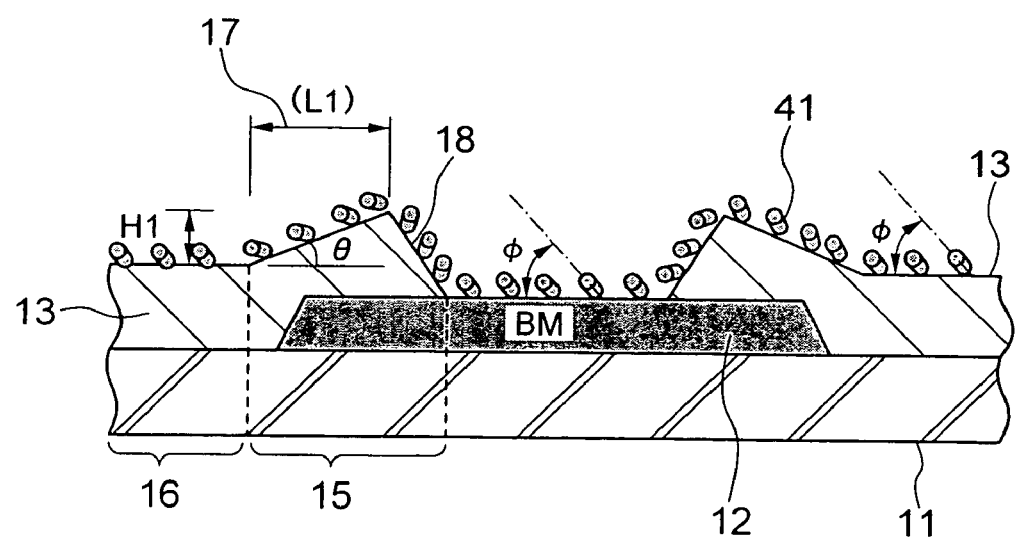
FIG. 2 is an enlarged sectional view of a portion of the color filter substrate of FIG. 1 before a polishing step for the coloring layers.

FIG. 2 shows the detail of a portion of the color filter substrate 10 of FIG. 1 before polishing the coloring layer 13. For the sake of understanding of the present invention, the coloring layer 13 before the polishing is shown as disposed in contact with the LC molecules 41 in FIG. 2. In other words, FIG. 2 shows an LCD device having a conventional color filter substrate which is formed without using the polishing step for the coloring layers 13.

In FIG. 2, The LC molecules 41 on the surface of the color filter substrate 10 are tilted from the surface of the color filter substrate 10 by the pre-tilt angle φ. The width at which the coloring layer 13 and the stripe of the black matrix 12 overlap each other is 3 μm, for example.

In the color filter substrate 10, the overlapping of the black matrix 12 and the coloring layer 13 forms a projected portion 15 in the surface of the coloring layer 13. The difference between the height of the projected portion 15 of the coloring layer 13 and the height of the flat portion 16 thereof which does not overlap the black matrix 12 is denoted by H1 in FIG. 2. The flat portion 16 corresponds to the pixel display area or effective opening area of the pixel. The projected portion 15 includes a slope area 17 having a length of L1 adjacent to the flat portion 16, and a rear edge 18 falling onto the surface of the stripe of the black matrix 12. The slope angle θ of the slope area (slope surface) 17 with respect to the surface of the glass substrate 11 is $\theta = \tan^{-1}(H1/L1)$.

Figure 3:
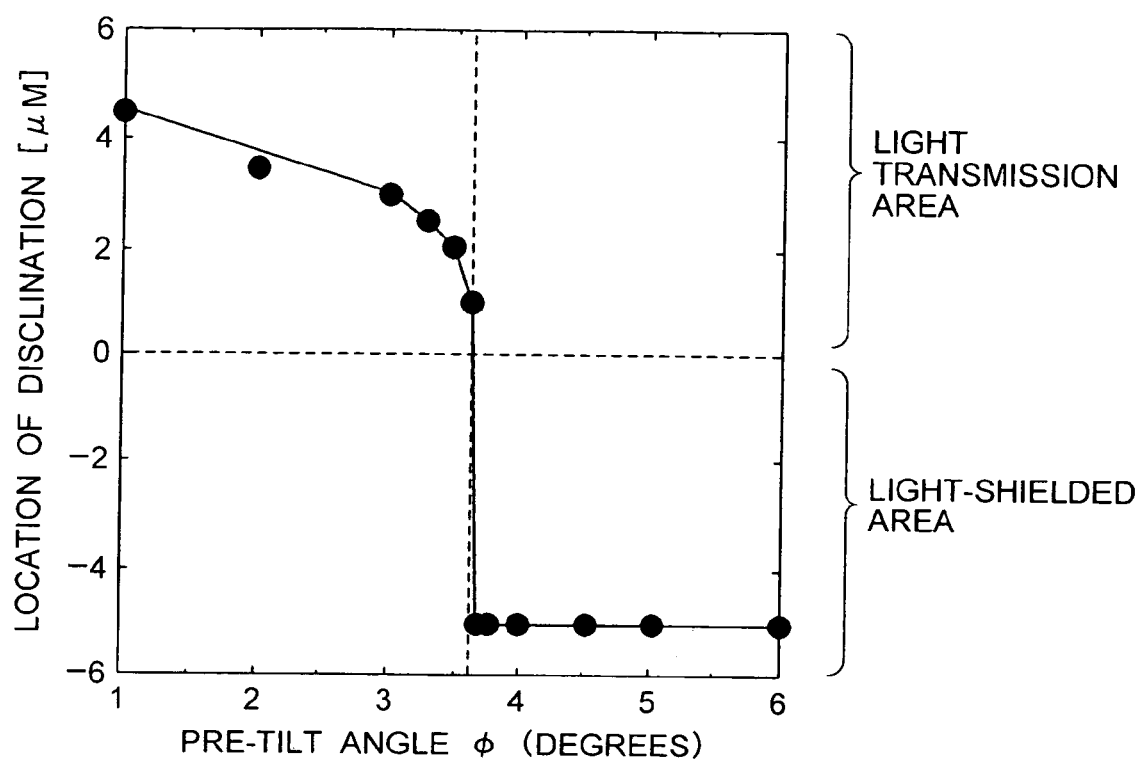
FIG. 3 is a graph showing the relationship between the pre-tilt angle of the color filter substrate before the polishing step and the location of a disclination.

FIG. 3 shows the result of simulation obtained with respect to the relationship between the pre-tilt angle φ and the location of the disclination in the LC layer before the polishing of the coloring layers 13. In this simulation, the angle φ of the slope area 17 is 10 degrees, and the width L1 of the slope area 17 is 10 μm. After a specified time interval is elapsed for stabilizing the alignment of the LC molecules since application of an electric field to the LC layer, the location of the disclination is detected. In FIG. 3, the pixel area of the color filter substrate 10 is divided into a light-shielded area shielded by the black matrix 12 and a light transmission area corresponding to the space of the black matrix 12. In addition, the boundary between the light-shielded area and the light transmission area is defined as an original point (0 μm), with the light-shielded area being a negative area and with the light-transmission area being a positive area.

In general, the LCD device suffers from a reverse tilt in the vicinity of the slope area 17 of the coloring layer 13, as shown in FIG. 2, wherein a discontinuity is generated in the direction of rotation of the LC molecules 41 between the flat area 16 and the projected area 15 of the coloring layer 13, thereby causing a disclination. As shown in FIG. 3, for the color filter substrate of FIG. 2 without using the polishing operation, a disclination is generated on the light transmission side of the boundary (edge of the stripe of the black matrix) if the pre-tilt angle φ is around 3.5 degrees or lower, thereby degrading the image quality in the pixel display area due to the leakage of light.

It is shown in the example of FIG. 3 that, for a pre-tilt angle of 4 degrees or above, the disclination enters the light-shielded area shielded by the stripe of the black matrix 12, whereby the diselination is not observed. The reverse tilt is generated depending on the relationship between the magnitude of the pre-tilt angle φ and the magnitude of the slope angle θ of the slope area 17. Thus, for suppressing the reverse tilt, it is generally necessary to set the pre-tilt angle to a lower value.

The pre-tilt angle φ is determined by the LC material and the orientation film; wherein the latter may provide a desired pre-tilt angle by suitably setting the rubbing intensity thereof. However, the material for an orientation film achieving a higher pre-tilt angle is limited, has a lower reliability due to the material itself, and is difficult to obtain an accurate control for the pre-tilt angle. Thus, it is not suitable to set an excessively higher pre-tilt angle in the LCD device.

FIG. 4 as mentioned above shows an enlarged profile of the coloring layers 13 in the LCD device of FIG. 1 after the polishing of the coloring layers 13. The polishing step for the coloring layers 13 is performed to reduce the height H1 before the polishing down to H2 shown in FIG. 4. In this step, the width L1 of the slope area 17 is reduced to L2. For example, if the slope angle θ is 7 degrees, the polishing is performed so that the width L2 of the slope area 17 of the coloring layer 13 assumes 2 μm. The present inventors found from a variety of experiments and simulations that the reduction of the width L1 down to L2 removes the disclination caused by the color filter substrate 10. The reason for removal of the disclination is considered as such detailed below.

In general, the LC molecules 41 disposed on the color filter substrate 10 is aligned at a pre-tilt angle φ defined by the orientation film, and the LC molecules 41 apart from the color filter substrate 10 are aligned with the aligned LC molecules on the color filter substrate 10. However, if the slope area 17 has a smaller width, and the relationship between the slope angle θ and the pre-tilt angle φ resides in a specific relationship, the LC molecules 41 which are a small distance apart from the slope area 17 of the color filter substrate 10 are more stable in the energy aspect thereof to align the LC molecules 41 disposed in the vicinity thereof than to align the LC molecules 41 on the color filter substrate 10. Thus, even if the LC molecules 41 on the slope area 17 of the color filter substrate 10 are aligned to cause a reverse tilt, most of the other LC molecules 41 on the slope area 17 are aligned in a direction so as not to generate a reverse tilt and thus not to cause a disclination.

In a conventional technique, it is considered that the difference of the height in the coloring layer 13 should be reduced to 0.5 μm. In the present embodiment, the surfaces of the coloring layers are mechanically polished to reduce the width L1 of the slope area 17, for suppressing the disclination. It was confirmed in the present invention that the difference in the height between the flat area 16 and the projected area 15 is in fact a superficial parameter, and the disclination can be suppressed by employing a specific combination of the pre-tilt angle φ, slope angle θ and the width L1 (L2) of the slope area 17.

Figure 5:
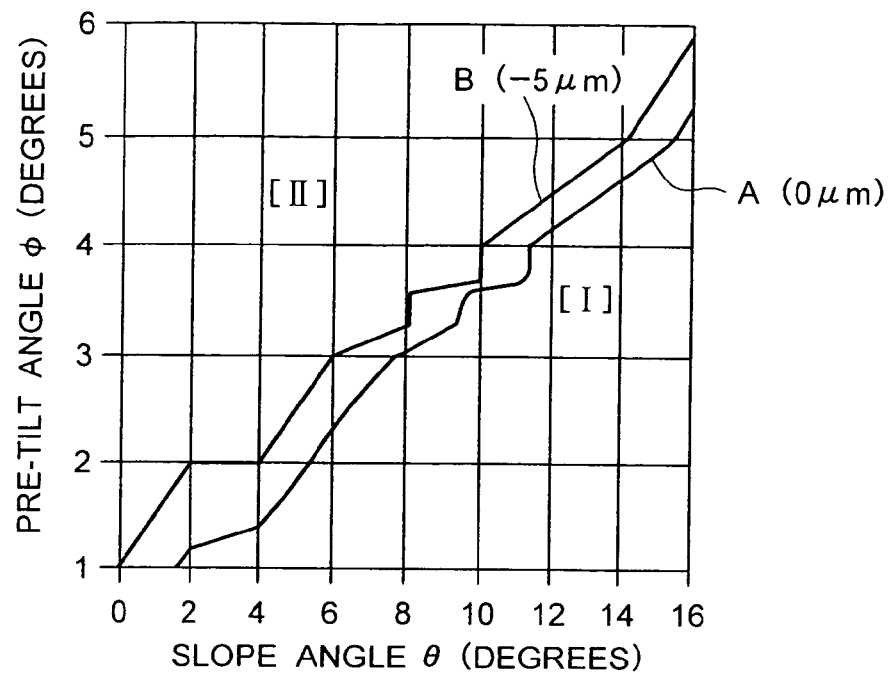
FIG. 5 is a graph showing the relationship between the location of the disclination and the conditions including the slope angle and pre-tilt angle.

FIG. 5 shows the relationship obtained by simulation between the location of the disclination and the combination of the pre-tilt angle φ and the slope angle θ. In this simulation, the boundary between appearance and disappearance of disclination is obtained while changing the pre-tilt angle φ and the slope angle θ. In FIG. 5, a graph A (denoted by 0 μm in parentheses) shows the appearance of disclination on the boundary, and a graph B (denoted by −5 μm in parentheses) shows the appearance of disclination at the location 5 μm apart from the boundary toward the light-shielded area. The distance 5 μm from the boundary, i.e., from the edge of the stripe of the black matrix, within the light-shielded area is selected herein to achieve a stable suppression of the disclination.

In FIG. 5, the area [II] which is left side of and above the graph B means the area where the disclination is not observed, whereas the area [I] which is right side of and below the graph A means the area where the disclination is observed. For example, if the slope angle is 5 degrees, the disclination is observed at a pre-tilt angle equal to or below 2 degrees, whereas the disclination is not observed at a pre-tilt angle of 3 degrees. The area [II] above the graph B is approximately defined by the following relationship:

$$\phi \geq 0.25\theta + 1 \quad (1).$$

More specifically, if the above relationship (1) holds, then the disclination is not observed in the LCD device.

Figure 6:
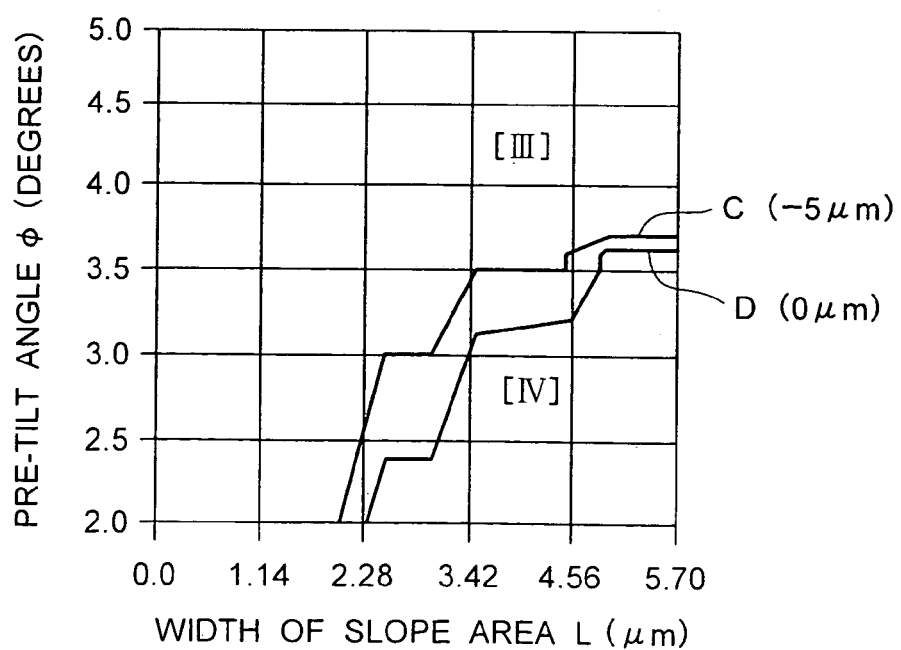
FIG. 6 is a graph showing the relationship between the location of the disclination and the conditions including the slope angle and the pre-tilt angle.

FIG. 6 shows the relationship obtained by a simulation between the location of the disclination and the combination of the pre-tilt angle $\phi$ and the width L1 or L2 of the slope area 17. In this simulation, the slope angle $\theta$ is fixed at 10 degrees while changing the pre-tilt angle $\phi$ and the width L1 of the slope area to obtain the location of the disclination. As shown in FIG. 5, the area [III] which is left side of and above the graph C (denoted by −5 μm in parentheses) means the area where the disclination is not observed, whereas the area [IV] which is right side of and below the graph D (denoted by 0 μm in parentheses) means the area where the disclination is observed. The area [III] above the graph C is approximately defined by the following relationship:

$$L \leq (0.03724\phi^2 + 1.034)^4 \quad (2).$$

The above relationship (2) may be rearranged as follows:

$$\phi \geq \sqrt{\frac{L^{1/4} - 1.034}{0.03724}}, \quad (3)$$

assuming herein $(L^{1/4} - 1.034) > 0$. More specifically, if the above relationship (2) or (3) holds, then the disclination is not observed in the LCD device.

The above equations (1) and (3) may be combined by adding together each side of the equations. Replacing the inequality signs with equality signs in these equations obtains the following formula:

$$2\phi = 0.25\theta + 1 + \sqrt{\frac{L^{1/4} - 1.034}{0.03724}}. \quad (4)$$

By using a discriminant D:

$$D = 2\phi - \left\{ 0.25\theta + 1 + \sqrt{\frac{L^{1/4} - 1.034}{0.03724}} \right\} > 0, \quad (5),$$

the area or range wherein the disclination is not observed can be obtained by the condition where D>0 is satisfied.

In the present embodiment, the coloring layers 13 are polished so as to allow the pre-tilt angle $\phi$, slope angle $\theta$ and width L2 of the slope area 17 to satisfy the above relationship D>0. For example, if the pre-tilt angle $\phi$ and the slope angle $\theta$ are 3 degrees and 10 degrees, respectively, the coloring layers 13 are polished so that the width L2 of the slope area 17 assumes 2.575 μm or below. In this way, if the pre-tilt angle μ of the LC molecules and the slope angle $\theta$ of the slope area 17 are known, the amount of removal of the coloring layers 13 by polishing thereof can be determined from the width L2 of the slope area 17 after the polishing.

In general, if the coloring layers are excessively removed by polishing, the LCD device suffers from degradation of the image quality. In the present invention, however, the amount of the removal can be determined based on the pre-tilt angle $\theta$, degradation of the image quality due to the excessive removal can be prevented. In addition, since an overcoat layer is not needed for prevention of the disclination in the color filter substrate of the present invention, the cost of the LCD device can be reduced while maintaining a superior contrast ratio of the LCD device as high as 200:1, for example.

Since the above embodiment is described only for an example, the present invention is not limited to the above embodiment and various modifications or alterations can be easily made therefrom by those skilled in the art without departing from the scope of the present invention.

What is claimed is:

1. A liquid crystal display device (LCD) comprising a TFT substrate, a color filter substrate, and a twisted nematic liquid crystal (LC) layer sandwiched between said TFT substrate and said color filter substrate, said color filter substrate comprising:

a transparent substrate;

a light shield layer formed on said transparent substrate and having a substantially lattice pattern;

a coloring layer formed on a portion of said transparent substrate within each space of said light shield layer and on an edge portion of a stripe of said light shield layer; and an orientation film overlying said coloring layers and the other portions of said stripes of said light shield layer, said coloring layer having a substantially flat surface overlying said space of said light shield layer, a slope surface having a width of not more than 2.575 μm extending and rising from said flat surface and overlying said edge portion of said stripe of said light shield layer, a polished flat surface extending from said slope surface, and a rear edge surface extending between said polished flat surface and said other portion of said stripe of said light shield layer, wherein the following relational expression holds:

$$D = 2\phi - \left( 0.25\theta + 1 + \sqrt{\frac{L^{1/4} - 1.034}{0.03724}} \right) > 0,$$

where the $\theta$, L and $\phi$ represent an angle of said slope surface with respect to a surface of said transparent substrate, a width of said slope surface, and a pre-tilt angle of LC molecules in said LC layer, respectively.

2. The LCD device according to claim 1, wherein said angle of said slope surface is between 5 degrees and 10 degrees inclusive of both.

3. The LCD device according to claim 1, wherein said LC layer is driven with a driving voltage between 3 volts and 5 volts inclusive of both.

4. The LCD device according to claim 1, wherein said LCD device has a contrast ratio of not less than 200:1.

5. A method for fabricating a color filter substrate in a liquid crystal display (LCD) device comprising a TFT substrate, said color filter substrate, and a twisted nematic liquid crystal (LC) layer sandwiched between said TFT substrate and said color filter substrate, said method comprising the consecutive steps of:

forming a light shield layer having a substantially lattice pattern on a transparent substrate;

forming a coloring layer on a portion of said transparent substrate within each space of said light shield layer and on an edge portion of a stripe of said light shield layer, said coloring layer having a substantially flat surface overlying said space of said light shield layer, a slope surface having a width of not more than 2.575 μm extending and rising from said flat surface and overlying said edge portion of said stripe of said light shield layer, and a rear edge surface extending between said slope surface and the other portion of said stripe of said light shield layer;

polishing a surface portion of said coloring layer so that a polished surface formed between said slope surface and said rear edge surface satisfies the following relational expression:

$$D = 2\phi - \left(0.25\theta + 1 + \sqrt{\frac{L^{1/4} - 1.034}{0.03724}}\right) > 0,$$

where the θ, L and φ represent an angle of said slope surface with respect to a surface of said transparent substrate, width of a remaining portion of said slope surface after said polishing, and a pre-tilt angle of LC molecules in said LC layer, respectively; and forming an orientation film overlying said coloring layer and the other portion of said light shield layer.

6. A liquid crystal display device (LCD) comprising a TFT substrate, a color filter substrate, and a twisted nematic liquid crystal (LC) layer sandwiched between said TFT substrate and said color filter substrate, said color filter substrate comprising:

a transparent substrate;

a light shield layer formed on said transparent substrate and having a substantially lattice pattern;

a coloring layer formed on a portion of said transparent substrate within each space of said light shield layer and on an edge portion of a stripe of said light shield layer; and an orientation film overlying said coloring layers and the other portions of said stripes of said light shield layer, said coloring layer having a substantially flat surface overlying said space of said light shield layer, a slope surface having a width of not more than 2.575 μm extending and rising from said flat surface and overlying said edge portion of said stripe of said light shield layer, a polished flat surface extending from said slope surface, and a rear edge surface extending between said polished flat surface and said other portion of said stripe of said light shield layer, wherein the following relational expression holds:

$$D = 2\phi - \left(0.25\theta + 1 + \sqrt{\frac{L^{1/4} - 1.034}{0.03724}}\right) > 0,$$

where the θ, L and φ represent an angle of said slope surface with respect to a surface of said transparent substrate, a width of said slope surface, and a pre-tilt angle of LC molecules in said LC layer, respectively, and wherein said pre-tilt angle is not more than 3 degrees.

7. The LCD device according to claim 6, wherein said angle of said slope surface is between 5 degrees and 10 degrees inclusive of both.

8. The LCD device according to claim 6, wherein said LC layer is driven with a driving voltage between 3 volts and 5 volts inclusive of both.

9. The LCD device according to claim 6, wherein said LCD device has a contrast ratio of not less than 200:1.

10. A method for fabricating a color filter substrate in a liquid crystal display (LCD) device comprising a TFT substrate, said color filter substrate, and a twisted nematic liquid crystal (LC) layer sandwiched between said TFT substrate and said color filter substrate, said method comprising the consecutive steps of:

forming a light shield layer having a substantially lattice pattern on a transparent substrate;

forming a coloring layer on a portion of said transparent substrate within each space of said light shield layer and on an edge portion of a stripe of said light shield layer, said coloring layer having a substantially flat surface overlying said space of said light shield layer, a slope surface having a width of not more than 2.575 μm extending and rising from said flat surface and overlying said edge portion of said stripe of said light shield layer, and a rear edge surface extending between said slope surface and the other portion of said stripe of said light shield layer;

polishing a surface portion of said coloring layer so that a polished surface formed between said slope surface and said rear edge surface satisfies the following relational expression:

$$D = 2\phi - \left(0.25\theta + 1 + \sqrt{\frac{L^{1/4} - 1.034}{0.03724}}\right) > 0,$$

where the θ, L and φ represent an angle of said slope surface with respect to a surface of said transparent substrate, width of a remaining portion of said slope surface after said polishing, and a pre-tilt angle of LC molecules in said LC layer, respectively, and wherein said pre-tilt angle is not more than 3 degrees; and forming an orientation film overlying said coloring layer and the other portion of said light shield layer.

* * * * *